E. Colby,
Fruit Basket.

No. 103,570. Patented May 31, 1870.

Witnesses:
Chauncey Nau
W. C. Rowley

Inventor:
E. Colby per
W. S. Loughborough & Co
Attys

United States Patent Office.

EASTMAN COLBY, OF BROCKPORT, NEW YORK.

Letters Patent No. 103,570, dated May 31, 1870.

IMPROVED FRUIT-BASKET.

The Schedule referred to in these Letters Patent and making part of the same.

I, EASTMAN COLBY, of Brockport, in the county of Monroe and State of New York, have invented certain Improvements in Baskets for Small Fruits, of which the following is a specification.

My invention relates to a receptacle for small fruits, constructed of tapering side splints so arranged and secured as to present many advantages, over the ordinary basket or box.

In the drawing—

Figure 3:
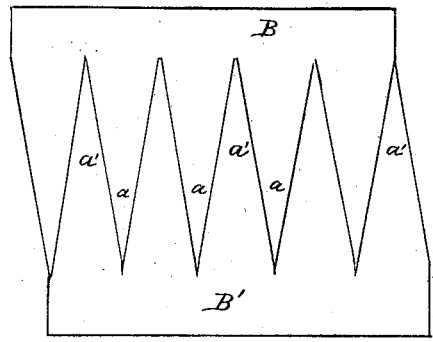
Figures 3 and 4 represent the mode of cutting out the splints.
Figure 4:
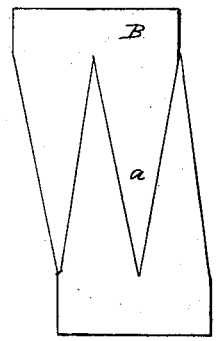

The sections B of splints are cut from a veneer or thin sheet of any suitable wood, by proper machinery, each section having projecting splints, a a', figs. 3 and 4, formed upon it.

It will be seen that the two sections B B' are formed in one piece, each being the "negative" of the other, the splints a on section B corresponding to the spaces in section B', and vice versa.

By this plan I am enabled to prevent the loss of material which would necessarily result from any other mode of cutting.

Figure 2:
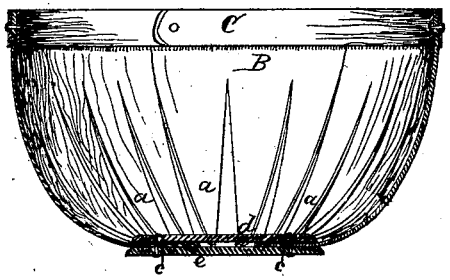
Figure 2 is a vertical section.

The sections B with the splints, may be crimped previous to making up, so as to correspond very nearly with the curve of the side of the basket, shown in fig. 2.

Figure 1:
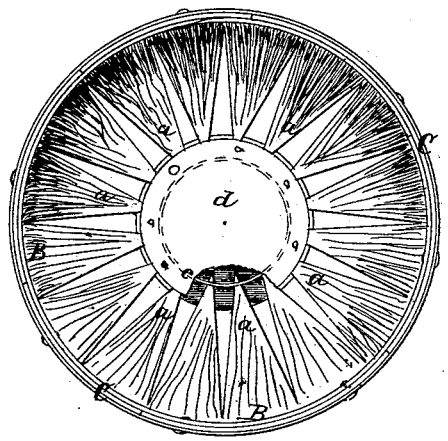
Figure 1 is a plan view of my invention.

The band C, figs. 1 and 2, which secures the sections of splints in the basket at the top, is a thin strip of a flexible wood, and is preferably made long enough to reach two or three times around the periphery, within and without.

Wrought nails or tacks, clenched upon one side, hold the sections securely together, and to the band.

The lower ends of the splints a are clasped between two disks, d e, which are also secured together by clenched nails, and, to prevent said ends from being drawn out, I provide a coil of wire, c, located between the splints and one of the disks e d, which, when the bottom is nailed on, is indented into the splints by the pressure.

This forms a very secure fastening, and, when the bottom is attached by means of a press especially adapted to the purpose, as is the preferable mode, it is impossible to separate the parts by any ordinary strain, even when shrunk by seasoning.

Since the splints a are made considerably tapering, and the spaces between them quite narrow at the top, it follows that the ventilating openings in the basket are widest at the bottom, whereby the air is more freely admitted at this point, and the fruit thus prevented from heating.

By means of the regular curve of the side splints outward, as shown, the fruit is supported along the sides of the basket, relieving it from vertical pressure, which would otherwise injure and crush it.

I do not wish to confine myself to the number of splints a formed upon one section B, but it is preferable that the latter be so proportioned as that two or more shall make a basket, the splint a being of any desired size.

I am aware that a patent has been granted to J. A. H. Ellis, dated April 7, 1857, for a basket constructed of vertical splints confined at top and bottom. He does not, however, provide any means of ventilation, but, on the contrary, claims a device for holding the splints together. Moreover, it is impossible for him to use in his invention the sections of splints prepared and formed as herein shown.

What I claim as my invention is—

As an improved article of manufacture, a fruit-basket composed of one or more sections, B, of tapering side splints, which are regularly curved outward, with alternate ventilating openings, said splints being confined by the double bottom d e, with or without the coil c, substantially as and for the purposes set forth.

Witnesses:             EASTMAN COLBY.
F. H. CLEMENT,
CHAUNCEY NASH.